(12) United States Patent
Matsumoto et al.

(10) Patent No.: US 8,298,673 B2
(45) Date of Patent: Oct. 30, 2012

(54) VIBRATION-DAMPING REINFORCEMENT COMPOSITION, VIBRATION-DAMPING REINFORCEMENT MATERIAL, AND METHOD FOR VIBRATION DAMPING AND REINFORCEMENT OF THIN SHEET

(75) Inventors: Mitsuo Matsumoto, Osaka (JP); Yasuhiko Kawaguchi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 294 days.

(21) Appl. No.: 12/734,357

(22) PCT Filed: Dec. 26, 2008

(86) PCT No.: PCT/JP2008/073824
§ 371 (c)(1),
(2), (4) Date: Apr. 27, 2010

(87) PCT Pub. No.: WO2009/087934
PCT Pub. Date: Jul. 16, 2009

(65) Prior Publication Data
US 2010/0256302 A1    Oct. 7, 2010

(30) Foreign Application Priority Data
Jan. 7, 2008   (JP) ................................. 2008-000747

(51) Int. Cl.
| | |
|---|---|
| B29C 65/64 | (2006.01) |
| B32B 15/092 | (2006.01) |
| B32B 17/10 | (2006.01) |
| B32B 25/18 | (2006.01) |
| B32B 27/38 | (2006.01) |
| C08J 5/18 | (2006.01) |
| C08L 9/00 | (2006.01) |
| C08L 9/02 | (2006.01) |
| C08L 63/00 | (2006.01) |

(52) U.S. Cl. ..................... 428/413; 156/307.7; 428/417; 428/418; 525/108

(58) Field of Classification Search .................. None
See application file for complete search history.

(56) References Cited

U.S. PATENT DOCUMENTS
| | | | | |
|---|---|---|---|---|
| 5,271,612 | A | * | 12/1993 | Yada et al. .................... 267/158 |
| 2005/0103422 | A1 | | 5/2005 | Kawaguchi |
| 2011/0031757 | A1 | * | 2/2011 | Mitsuoka et al. .............. 290/55 |

FOREIGN PATENT DOCUMENTS
| | | | |
|---|---|---|---|
| JP | 59-193966 | | 11/1984 |
| JP | 61-155483 | | 7/1986 |
| JP | 61-155483 A | * | 7/1986 |
| JP | 62-243672 A | * | 10/1987 |
| JP | 04-089849 | | 3/1992 |
| JP | 06-170997 | | 6/1994 |
| JP | 07-137208 | | 5/1995 |
| JP | 09-029895 | | 2/1997 |
| JP | 2000-169646 | | 6/2000 |
| JP | 2005-139218 | | 6/2002 |
| RU | 1352922 A1 | * | 11/1995 |
| WO | WO 03/050004 | | 7/2003 |

* cited by examiner

*Primary Examiner* — Robert Sellers
(74) *Attorney, Agent, or Firm* — Jean C. Edwards, Esq.; Edwards Neils PLLC

(57) ABSTRACT

A vibration-damping reinforcement composition contains 30 to 300 parts by weight of butyl rubber, 30 to 300 parts by weight of acrylonitrile-butadiene rubber, 100 parts by weight of epoxy resin, and 0.5 to 30 parts by weight of an epoxy resin curing agent.

5 Claims, 1 Drawing Sheet

(a) 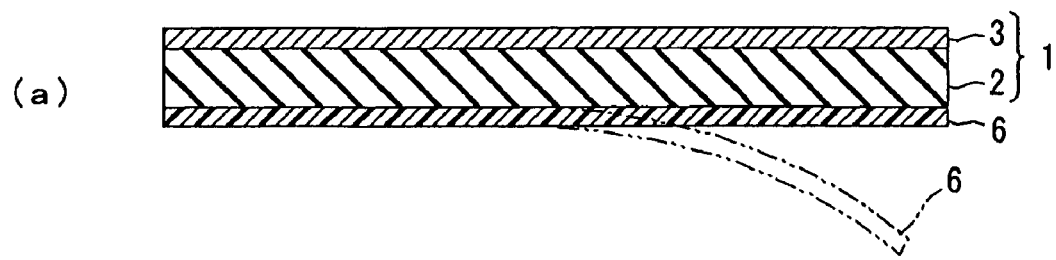
(b) 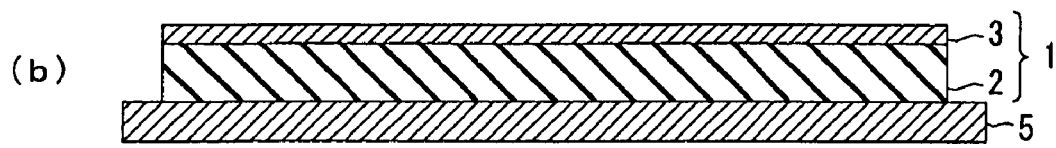
(c) 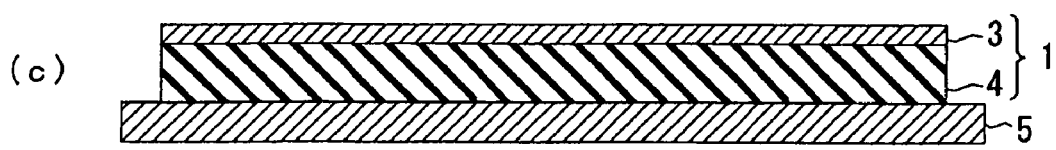

VIBRATION-DAMPING REINFORCEMENT COMPOSITION, VIBRATION-DAMPING REINFORCEMENT MATERIAL, AND METHOD FOR VIBRATION DAMPING AND REINFORCEMENT OF THIN SHEET

CROSS-REFERENCE TO RELATED APPLICATIONS

The present invention is a 35 USC 371 national stage entry of PCT/JP2008/073824, filed Dec. 26, 2008, which claims priority from Japanese Patent Application No. 2008-000747, filed Jan. 7, 2008, the contents of all of which are herein incorporated by reference in their entirety.

TECHNICAL FIELD

The present invention relates to a vibration-damping reinforcement composition, a vibration-damping reinforcement material, and a method for vibration-damping and reinforcement of thin sheet.

BACKGROUND ART

Heretofore, improvement in reinforcing characteristics has been needed for a thin sheet used for structures such as an automobile and a household electrical appliance, to achieve prevention of deformation by external stresses.

For example, reinforcement of a steel plate has been proposed as follows (for example, Patent Document 1 below). A steel plate reinforcement sheet is obtained by preparing a steel plate reinforcement resin composition containing epoxy resin, acrylonitrile-butadiene rubber, a curing agent, and a foaming agent; rolling the prepared resin composition to mold a resin layer; and then laminating a reinforcement layer onto the resin layer. Then, the steel plate reinforcement sheet is adhesively bonded to a steel plate, and foamed and cured so that the steel plate is reinforced.

Additionally, use of a thin sheet for automobiles or household electrical appliances involves generation of vibration sound, and therefore improvement in vibration-damping characteristics is also needed for the thin sheet in order to prevent the generation of such vibration sound.

Thus, to improve both of the reinforcing characteristics and vibration-damping characteristics, there has been proposed a foaming thermosetting resin sheet in which three layers are laminated in order, the three layers being a spacer layer containing a liquid epoxy resin, a methacrylic resin, and a curing agent; a vibration-damping material sheet layer containing butyl rubber; and a metal sheet (for example, Patent Document 2 below). By adhesively bonding the foaming thermosetting resin sheet to a thin sheet, the spacer layer works to improve the reinforcing characteristics (rigidity), and the vibration-damping material sheet layer works to improve the vibration-damping characteristics.
Patent Document 1: Japanese Unexamined Patent Publication No. 2005-139218
Patent Document 2: Japanese Unexamined Patent Publication No. H6-170997

DISCLOSURE OF THE INVENTION

Problem to be Solved by the Invention

However, both of the reinforcing characteristics and vibration-damping characteristics of the foaming thermosetting resin sheet of the above cited Patent Document 2 are inferior compared with the case where the reinforcement sheet and the vibration-damping sheet are adhesively bonded individually.

Also, because the spacer layer and the vibration-damping material sheet layer are laminated onto the metal sheet in the foaming thermosetting resin sheet of the above cited Patent Document 2, there are disadvantages of increase in weight and thickness.

Additionally, because the foaming thermosetting resin sheet includes an interface between the spacer layer and the vibration-damping sheet layer, and an interface between the vibration-damping sheet layer and the metal sheet, disadvantages such as slippage, peeling, or falling off easily occur at such interfaces to that extent, when the foaming thermosetting resin sheet is disposed along the vertical direction.

Furthermore, when manufacturing the foaming thermosetting resin sheet described in Patent Document 2 above, a spacer layer and a vibration-damping sheet layer which have different characteristics such as thickness, viscosity, or elasticity from each other are laminated onto the metal sheet, and therefore the laminating method has to be adjusted according to the characteristics of each layer. Therefore, problems of complicating the manufacturing method and reducing productivity are caused. Also, handleability of the obtained foaming thermosetting resin sheet may be reduced.

An object of the present invention is to provide a vibration-damping reinforcement composition that is capable of enhancing both reinforcing characteristics and vibration-damping characteristics for a thin sheet by itself; a vibration-damping reinforcement sheet in which the vibration-damping reinforcement composition is used; and a method for vibration-damping and reinforcement using the vibration-damping reinforcement sheet.

Means for Solving the Problem

To achieve the above object, a vibration-damping reinforcement composition of the present invention includes 30 to 300 parts by weight of butyl rubber, 30 to 300 parts by weight of acrylonitrile-butadiene rubber, 100 parts by weight of epoxy resin, and 0.5 to 30 parts by weight of an epoxy resin curing agent.

In the vibration-damping reinforcement composition of the present invention, it is preferable that the butyl rubber has a Mooney viscosity of 25 to 90 ($ML_{1+8}$, 125° C.), and a degree of unsaturation of 0.8 to 2.2.

In the vibration-damping reinforcement composition of the present invention, it is preferable that 10 to 150 parts by weight of polybutene relative to 100 parts by weight of the butyl rubber is contained.

A vibration-damping reinforcement sheet of the present invention includes a vibration-damping reinforcement layer that is obtained by molding the vibration-damping reinforcement composition into a sheet, and a restricting layer that is laminated onto one side of the vibration-damping reinforcement layer.

Furthermore, in a method for vibration-damping and reinforcement of thin sheet according to the present invention, the vibration-damping reinforcement sheet is disposed on a thin sheet, and then the vibration-damping reinforcement layer is heated to be cured.

Effects of the Invention

Both of the reinforcing characteristics and vibration-damping characteristics for a thin sheet can be improved by adhesively bonding the vibration-damping reinforcement sheet to a thin sheet, the vibration-damping reinforcement sheet being obtained by molding the vibration-damping reinforcement composition of the present invention into a sheet, and heating and curing the sheet.

Therefore, the vibration-damping reinforcement sheet of the present invention is capable of improving both of the reinforcing characteristics and vibration-damping characteristics for a thin sheet by itself, suppressing an increase in weight and thickness, and suppressing slippage, peeling, or falling off at interfaces.

Furthermore, there is no need to adjust the laminating method, and the manufacturing method is less complicated, and therefore reduction in productivity can be suppressed.

Also, reduction in handleability of the obtained vibration-damping reinforcement sheet can be suppressed.

BRIEF DESCRIPTION OF THE DRAWINGS

FIG. 1 is a diagram illustrating, as an embodiment of the method for vibration-damping and reinforcement of thin sheet according to the present invention, a method for damping vibrations of and reinforcing a thin sheet: in the method, a vibration-damping reinforcement sheet is disposed on a thin sheet, and the vibration-damping reinforcement layer is heated and cured. FIG. 1($a$) illustrates a step of preparing a vibration-damping reinforcement sheet and peeling off an exfoliate paper; ($b$) illustrates a step of disposing the vibration-damping reinforcement sheet on a thin sheet; and ($c$) illustrates a step of heating and curing the vibration-damping reinforcement layer.

EMBODIMENT OF THE INVENTION

The vibration-damping reinforcement composition of the present invention contains, as essential components, butyl rubber, acrylonitrile-butadiene rubber, epoxy resin, and an epoxy resin curing agent.

Butyl rubber is a synthetic rubber obtained by copolymerization of isobutene (isobutylene) with isoprene.

Known butyl rubbers may be used as the butyl rubber. The butyl rubber has a degree of unsaturation of, for example, 0.8 to 2.2, or preferably 1.0 to 2.0; and a Mooney viscosity ($ML_{1+8}$, at 125° C.) of, for example, 25 to 90, preferably 30 to 60, or more preferably 30 to 55. Such a butyl rubber has excellent vibration-damping characteristics.

The butyl rubber may be used alone, or two or more butyl rubbers having different physical properties may be used in combination. The mixing ratio of the butyl rubber(s) is, for example, 30 to 300 parts by weight, or preferably 50 to 250 parts by weight relative to 100 parts by weight of the epoxy resin. When the mixing ratio of the butyl rubber is below 30 parts by weight, although sufficient reinforcing characteristics are exhibited, the vibration-damping characteristics may become insufficient after the heating and curing, which may make it difficult to achieve both of the reinforcing characteristics and vibration-damping characteristics at the same time. When the mixing ratio of the butyl rubber exceeds 300 parts by weight, the reinforcing characteristics may become insufficient, which also may make it difficult to achieve both of the reinforcing characteristics and vibration-damping characteristics at the same time.

Acrylonitrile-butadiene rubber is a synthetic rubber obtained by copolymerization of acrylonitrile with butadiene. The acrylonitrile-butadiene rubber also includes, for example, a terpolymer in which a carboxyl group is introduced.

Known acrylonitrile-butadiene rubbers may be used as the acrylonitrile-butadiene rubber. The acrylonitrile-butadiene rubber has an acrylonitrile content of, for example, 15 to 50 wt %, or preferably 25 to 40 wt %; and a Mooney viscosity ($ML_{1+4}$, at 100° C.) of, for example, 25 to 80, or preferably 30 to 60.

The acrylonitrile-butadiene rubber may be used alone, or two or more acrylonitrile-butadiene rubbers having different physical properties may be used in combination. The mixing ratio of the acrylonitrile-butadiene rubber is, for example, 30 to 300 parts by weight, or preferably 50 to 200 parts by weight relative to 100 parts by weight of the epoxy resin.

Examples of the epoxy resin include bisphenol A epoxy resin, bisphenol F epoxy resin, phenol novolak epoxy resin, cresol novolak epoxy resin, alicyclic epoxy resin, triglycidyl isocyanurate, nitrogen-containing-cyclic epoxy resin such as hydantoin epoxy resin, hydrogenated bisphenol A epoxy resin, aliphatic epoxy resin, glycidyl ether epoxy resin, bisphenol S epoxy resin, biphenyl epoxy resin, dicyclo epoxy resin, and naphthalene epoxy resin.

As the epoxy resin curing agent, a heat-curing type curing agent that cures epoxy resin by heat is preferably used, and examples of the heat-curing type curing agent include amine compounds, acid anhydride compounds, amide compounds, hydrazide compounds, imidazole compounds, and imidazoline compounds. Phenol compounds, urea compounds, and polysulfide compounds are also examples of the heat-curing type curing agent.

Examples of the amine compounds include ethylenediamine, propylenediamine, diethylenetriamine, triethylenetetramine, amine adducts thereof, metaphenylenediamine, diaminodiphenylmethane, and diaminodiphenylsulfone.

Examples of the acid anhydride compounds include phthalic anhydride, maleic anhydride, tetrahydrophthalic anhydride, hexahydrophthalic anhydride, methyl nadic anhydride, pyromelletic anhydride, dodecenylsuccinic anhydride, dichlorosuccinic anhydride, benzophenonetetracarboxylic anhydride, and chlorendic anhydride.

Examples of the amide compounds include dicyandiamide and polyamide.

Examples of the hydrazide compounds include adipic acid dihydrazide.

Examples of the imidazole compounds include methyl imidazole, 2-ethyl-4-methyl imidazole, ethylimidazole, isopropyl imidazole, 2,4-dimethyl imidazole, phenylimidazole, undecylimidazole, heptadecylimidazole, and 2-phenyl-4-methylimidazole.

Examples of the imidazoline compounds include methylimidazoline, 2-ethyl-4-methylimidazoline, ethylimidazoline, isopropylimidazoline, 2,4-dimethylimidazoline, phenylimidazoline, undecylimidazoline, heptadecylimidazoline, and 2-phenyl-4-methyl imidazoline.

Among the above-described curing agents, a latent curing agent is preferable and examples of such a latent curing agent include dicyandiamide and adipic acid dihydrazide.

These curing agents may be used alone, or may be used in combination. In the above examples, dicyandiamide is preferably used, in view of adhesiveness.

The mixing ratio of the epoxy resin curing agent is, for example, 0.5 to 30 parts by weight, or preferably 1 to 10 parts by weight relative to 100 parts by weight of the epoxy resin.

Also, as necessary, a curing accelerator may also be mixed along with the curing agent. Examples of the curing accelerator include imidazoles, ureas, tertiary amines, phosphorus compounds, quaternary ammonium salts, and organic metal salts. These curing accelerators may be used alone, or may be used in combination.

The mixing ratio of the curing accelerator is, for example, 0.1 to 20 parts by weight, or preferably 2 to 15 parts by weight relative to 100 parts by weight of the epoxy resin.

Additionally, in the vibration-damping reinforcement composition of the present invention, those generally known additives for rubber compositions, such as filler, lubricant, softener, tackifier, a foaming agent, and an antiaging agent may be optionally contained other than the above-described components.

Examples of the filler include talc, calcium carbonate, carbon black, titanium oxide, silica, aluminum hydroxide (alumina), and magnesium hydroxide. These fillers may be used alone, or may be used in combination. The mixing ratio of the filler is, for example, 300 parts by weight or less, or preferably 30 to 150 parts by weight in terms of weight, relative to 100 parts by weight of the above-described essential components (that is, a total of butyl rubber, acrylonitrile-butadiene rubber, epoxy resin, and epoxy resin curing agent).

Examples of the lubricant include stearic acid and metal salts of stearic acid. The lubricant may be used alone or in combination. The mixing ratio of the lubricant is, for example, 0.5 to 3 parts by weight, or preferably 1 to 2 parts by weight relative to 100 parts by weight of the above-described essential components.

As the softener, those softeners that are compatible with butyl rubber may be used. Examples of the softener include liquid rubbers such as liquid isoprene rubber, liquid butadiene rubber, and polybutene; and aliphatic process oil. Preferable example is polybutene.

Known polybutene may be used. The polybutene has a kinetic viscosity at 40° C. of, for example, 10 to 200000 $mm^2/s$, or preferably 1000 to 100000 $mm^2/s$, and has a kinetic viscosity at 100° C. of, for example, 2.0 to 4000 $mm^2/s$, or preferably 50 to 2000 $mm^2/s$. By mixing such polybutene, butyl rubber can be softened.

These softeners may be used alone or in combination, and the mixing ratio of the softener is, for example, 10 to 150 parts by weight, or preferably 30 to 120 parts by weight relative to 100 parts by weight of the butyl rubber. When the mixing ratio of the softener exceeds the above-described range, strength may decrease excessively.

Examples of the tackifier include coumarone-indene resin, phenol-formaldehyde resin, xylene-formaldehyde resin, terpene resin (polyterpene resin), petroleum resin, and rosin resin (rosin ester). These tackifiers may be used alone or in combination, and the mixing ratio of the tackifier is, for example, 10 to 100 parts by weight, or preferably 20 to 50 parts by weight relative to 100 parts by weight of the above-described essential components. When in use, a vibration-damping reinforcement sheet, in which a restricting layer is laminated onto a vibration-damping reinforcement layer obtained by molding the vibration-damping reinforcement composition into a sheet, is adhesively bonded to, for example, a steel plate. In such a case, although it depends on conditions under which the sheet is used, in view of improvement in adhesiveness, a tackifier is preferably contained.

Examples of the foaming agent include thermally decomposable foaming agents such as an inorganic foaming agent and an organic foaming agent.

Examples of the inorganic foaming agents include ammonium carbonate, ammonium hydrogen carbonate, sodium hydrogen carbonate, ammonium nitrite, sodium borohydride, and azides.

Examples of the organic foaming agents include an N-nitroso compound (N,N'-dinitrosopentamethylenetetramine, N,N'-dimethyl-N,N'-dinitrosoterephthalamide, etc.), an azoic compound (for example, azobis isobutyronitrile, azodicarboxylic amide, barium azodicarboxylate, etc.), alkane fluoride (for example, trichloromonofluoromethane, dichloromonofluoromethane, etc.), a hydrazine compound (for example, paratoluene sulfonyl hydrazide, diphenylsulfone-3, 3'-disulfonyl hydrazide, 4,4'-oxybis (benzene sulfonyl hydrazide)(OBSH), allylbis (sulfonyl hydrazide), etc.), a semicarbazide compound (for example, p-toluylenesulfonyl semicarbazide, 4,4'-oxybis (benzene sulfonyl semicarbazide) etc.), and a triazole compound (for example, 5-morphoryl-1, 2,3,4-thiatriazole).

Examples of the foaming agent also include a gas-encapsulating microcapsule foaming agent. To be specific, thermally expansible microparticles of microcapsules (for example, microcapsules made of thermoplastic resins such as vinylidene chloride, acrylonitrile, acrylic ester, and methacrylic ester) encapsulating thermally expansible material (for example, isobutane, pentane, etc.) may be used. As such thermally expansible microparticles, a commercially available product, for example, Microsphere® (trade name, manufactured by Matsumoto Yushi-Seiyaku Co., Ltd.) is used.

These foaming agents may be used alone, or may be used in combination of two or more. Among these foaming agents, a thermally decomposable foaming agent is preferable, and OBSH is more preferable.

The mixing ratio of the foaming agent is, although it depends on the curing temperature or curing time, for example, 20 parts by weight or less, or preferably 0.5 to 5 parts by weight relative to 100 parts by weight of the above-described essential components. When the mixing ratio of the foaming agent is within the above-described range, the foam ratio of the vibration-damping reinforcement composition when heated can be set to 5 times or less.

Examples of the antiaging agent include those antiaging agents based on amine-ketones, aromatic secondary amines, phenols, benzimidazoles, dithiocarbamates, thioureas, and phosphorous acid. These antiaging agents may be used alone or in combination, and its mixing ratio is, for example, 0.01 to 10 parts by weight, or preferably 0.1 to 5 parts by weight relative to 100 parts by weight of the above-described essential components.

To prepare the vibration-damping reinforcement composition of the present invention, the above-described essential components and optional components are mixed at the above-described mixing ratio, and homogenously mixed. The vibration-damping reinforcement composition can also be prepared by, for example, kneading the above-described components using a mixing roll, a pressure kneader, an extruder, etc.

The vibration-damping reinforcement sheet of the present invention includes a vibration-damping reinforcement layer obtained by forming the above-described vibration-damping reinforcement composition into a sheet; and a restricting layer laminated onto one side of the vibration-damping reinforcement layer.

To form the vibration-damping reinforcement layer, for example, the vibration-damping reinforcement composition is formed into a sheet by a molding method such as calendering, extrusion molding, or press molding.

Upon forming the vibration-damping reinforcement layer, there is no particular limitation on the temperature conditions. However, when the vibration-damping reinforcement composition contains a cross-linking agent and, as necessary, a foaming agent, the temperature condition is set to less than the temperature at which the cross-linking agent and the foaming agent are not substantially decomposed (for example, 60 to 100° C.).

The vibration-damping reinforcement layer thus formed has a thickness of, for example, 0.5 to 5.0 mm, or preferably 1.0 to 3.0 mm.

The restricting layer restricts the vibration-damping reinforcement layer, and adds tenacity to the vibration-damping reinforcement layer to achieve improvement in strength. The restricting layer is in the form of a sheet, and is formed of a material that is lightweight, thin, and capable of being brought into close contact with and integrated with a heated vibration-damping reinforcement layer. Examples of such a material include metal foils such as aluminum foil, stainless steel foil, etc.; unwoven glass cloth (glass fiber cloth) or woven glass cloth, which are made of glass; and unwoven carbon fiber cloth or woven carbon fiber cloth, which are made of carbon fiber. Aluminum foil and glass fiber cloth are preferable examples.

The thickness of the restricting layer is, for example, 0.1 to 0.5 mm. When the restricting layer is formed of metal foil, in view of handleability, the thickness is preferably 100 μm or less. When the restricting layer is formed of glass fiber cloth, in view of handleability, the thickness is preferably 300 μm or less.

The vibration-damping reinforcement sheet of the present invention can be obtained by adhesively bonding the above-described vibration-damping reinforcement layer to the restricting layer. The bonding method is not particularly limited. For example, the vibration-damping reinforcement layer and the restricting layer are laminated, and press-contacted to be adhesively bonded. The thickness of the vibration-damping reinforcement layer and the restricting layer in total is, for example, 0.6 to 5.5 mm, or preferably 1.1 to 3.5 mm.

Thus obtained vibration-damping reinforcement sheet is capable of achieving both of reinforcing characteristics and vibration-damping characteristics at the same time by itself.

That is, the vibration-damping reinforcement sheet has a bending strength at a 1 mm displacement of, for example, 10 to 30N, or preferably 13 to 25N, in "reinforcing characteristics" evaluated in Examples to be described later. When the bending strength is below the above-described range, the thin sheet may not be reinforced sufficiently.

The vibration-damping reinforcement sheet has a loss factor at 0° C., 20° C., 40° C., and 60° C. of, for example, 0.03 to 0.2, or preferably 0.04 to 0.15, in "vibration-damping characteristics" evaluated in Examples to be described later. When the loss factor is below the above-described range, the vibration-damping of the thin sheet may not be exhibited sufficiently.

As necessary, a separator (exfoliate paper) may be adhesively bonded to the obtained vibration-damping reinforcement sheet, on the surface of the vibration-damping reinforcement layer (a surface on the other side of the surface onto which the restricting layer is laminated) until the sheet is actually used.

The vibration-damping reinforcement sheet of the present invention is used for damping vibrations of and reinforcing a thin sheet.

The thin sheet is used in various industries, for example, in automobiles and household electrical appliances. To be specific, the thin sheet for automobiles is used, for example, for pillars, roofs, fenders, hoods, trunks, quarter panels, doors, door handles, and door mirrors of automobiles. The thin sheet for household electrical appliances is used, for example, for a housing of computer, computer display, television, mobile phone, game console, refrigerator, and cleaner.

FIG. 1 is a diagram illustrating, as an embodiment of the method for vibration-damping and reinforcement of thin sheet according to the present invention, a method for damping vibrations of and reinforcing a thin sheet: in the method, a vibration-damping reinforcement sheet is disposed on a thin sheet, and the vibration-damping reinforcement layer is heated and cured.

Next, with reference to FIG. 1, an embodiment of the method for vibration-damping and reinforcement of thin sheet according to the present invention is described.

As shown in FIG. 1(a), in a vibration-damping sheet 1, a vibration-damping reinforcement layer 2 is laminated onto a restricting layer 3. As necessary, an exfoliate paper 6 is adhesively bonded to the surface of the vibration-damping reinforcement layer 2. The vibration-damping reinforcement layer 2 is curable, and a foaming agent is not mixed in its vibration-damping reinforcement composition.

Upon use, the exfoliate paper 6 is removed from the surface of the vibration-damping reinforcement layer 2 as indicated by the phantom line, and the surface of the vibration-damping reinforcement layer 2 is adhesively bonded to a thin sheet 5 (the thin sheet 5 before heating), as shown in FIG. 1(b).

Thereafter, the vibration-damping reinforcement sheet 1 is heated, as shown in FIG. 1(c). To heat the vibration-damping reinforcement sheet 1, for example, heat produced in a coating and drying process of the thin sheet 5 is used. The heating temperature is, for example, 130 to 220° C., and the heating period is, for example, 10 to 60 minutes, which are general coating and drying conditions for automobiles and home electronics, although depending on the kind and the content ratio of the cross-linking agent.

The heating causes the vibration-damping reinforcement layer 2 to be cured, and the strength thereof increases, thereby causing the vibration-damping reinforcement layer 2 to become a cured layer 4. Thus, the vibration-damping reinforcement sheet 1 improves reinforcing characteristics for the thin sheet 5 and improves vibration-damping characteristics for the thin sheet 5.

In addition, because only one layer of the vibration-damping reinforcement layer 2 is cured, the cured layer 4 is lightweight and thin, effectively suppressing the increase in weight (grammage) of the vibration-damping reinforcement sheet 1.

Furthermore, because only one layer of the vibration-damping reinforcement layer 2 is laminated onto the restricting layer 3, the vibration-damping reinforcement sheet 1 is obtained with high productivity, and further, is excellent in handleability.

EXAMPLES

Hereinafter, the present invention is described in further in detail with reference to Examples and Comparative Example. However, the present invention is not limited to these Examples and Comparative Example.

Examples 1 to 3 and Comparative Example

Preparation of Vibration-Damping Reinforcement Composition

A vibration-damping reinforcement composition was prepared by mixing components on parts-by-weight basis using the mixing formulation shown in Table 1, and kneading the mixture with a mixing roll.

TABLE 1

| | Mixing Amount (parts by weight) | | | |
|---|---|---|---|---|
| | Example 1 | Example 2 | Example 3 | Comparative Example |
| Butyl Rubber | 200 | 160 | 200 | 25 |
| Polybutene | 100 | 80 | 200 | 50 |
| NBR | 100 | 60 | 167 | 75 |
| Epoxy Resin | 100 | 100 | 100 | 100 |
| Carbon Black | 25 | 20 | 33.3 | 12.5 |
| Calcium Carbonate | 312.5 | 250 | 417 | 156 |
| Talc | 125 | 100 | 167 | 62.5 |
| Terpene Resin | 125 | 100 | 167 | 62.5 |
| Dicyandiamide | 12.5 | 10 | 16.7 | 6.25 |
| Curing Accelerator | 3.75 | 3 | 5 | 1.88 |

Details of the components or abbreviations of the components in Table 1 are shown below.

Butyl Rubber: JSR butyl 268, degree of unsaturation 1.6, Mooney viscosity 51 ($ML_{1+8}$, at 125° C.), manufactured by JSR Corporation Polybutene: Nisseki polybutene HV 300, kinetic viscosity 26000 mm$^2$/s (at 40° C.), kinetic viscosity 590 mm$^2$/s (at 100° C.), manufactured by Nippon Oil Corporation NBR: Acrylonitrile-Butadiene Rubber (acrylonitrile content 33.5 wt %, Mooney viscosity 46 ($ML_{1+4}$, at 100° C.), trade name "Nipol 1052J", manufactured by ZEON Corporation Epoxy Resin: 834, manufactured by Japan Epoxy Resins Co., Ltd.

Carbon Black: Asahi #50 (filler), manufactured by Asahi Carbon Co, Ltd.

Calcium Carbonate: calcium carbonate heavy (filler), manufactured by Maruo calcium Co., Ltd.

Talc: Imported Talc (filler), manufactured by Sobue Clay Co., Ltd.

Terpene resin: YS Resin Px 1150 (tackifier), manufactured by YASUHARA CHEMICAL CO., LTD.

Dicyandiamide: OMICURE DDA-50 (curing agent), manufactured by CVC Specialty Chemicals Inc.

Curing Accelerator: Curezol ZMA-OK, manufactured by Shikoku Chemicals Corporation (Production of Vibration-Damping Reinforcement sheet)

Then, a vibration-damping reinforcement sheet having a thickness of 2 mm was made (ref. FIG. 1 (a)) as follows. The prepared vibration-damping reinforcement composition was rolled by press molding to form a vibration-damping reinforcement layer. As a restricting layer, glass fiber cloth having a thickness of 0.2 mm was prepared and adhesively bonded to this vibration-damping reinforcement layer.

(Evaluation)

1) Reinforcing Characteristics

The vibration-damping sheets obtained in Examples and Comparative Example were cut to give a size of 25×150 mm. The sheets were adhesively bonded to a test steel plate (thin sheet) having a size of 0.8×10×250 mm (ref. FIG. 1(b)). Then, the test plate with the sheet was heated at 180° C. for 20 minutes to allow curing, so that test samples were obtained (ref. FIG. 1(c)).

Thereafter, the test samples were supported with a span of 100 mm, with the test steel plate side up. A test bar was allowed to descend from above in a vertical direction at a rate of compression of 1 mm/min on the lengthwise center portion of the test piece. The bending strength when the cured layer displaced its position by 1 mm after the bar was brought in contact with the test steel plate was evaluated as reinforcing characteristics. The results are shown in Table 2.

2) Vibration-Damping Characteristics (Loss Factor)

The vibration-damping sheets obtained in Examples and Comparative Example were cut to give a size of 10×250 mm. The sheets were adhesively bonded to a steel plate having a size of 0.8×10×250 mm (ref. FIG. 1(b)). Then, the steel plate with the sheet was heated at 180° C. for 20 minutes to allow curing, so that test samples were obtained (ref. FIG. 1(c)).

Thereafter, the loss factor associated with the second resonance point at temperatures of 0° C., 20° C., 40° C., and 60° C. of the vibration-damping sheet 1 was measured by the center excitation method. A criterion for excellent vibration-damping characteristics is a loss factor of 0.05 or more. The results are shown in Table 2.

TABLE 2

| | Reinforcing Characteristics | Loss Factor | | | |
|---|---|---|---|---|---|
| | (N) | 0° C. | 20° C. | 40° C. | 60° C. |
| Example 1 | 18.35 | 0.085 | 0.099 | 0.093 | 0.078 |
| Example 2 | 23.695 | 0.081 | 0.077 | 0.072 | 0.049 |
| Example 3 | 15 | 0.100 | 0.130 | 0.090 | 0.090 |
| Comparative Example | 31.2 | 0.03 | 0.017 | 0.01 | 0.01 |

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The method for vibration-damping and reinforcement of thin sheet according to the present invention, in which the vibration-damping reinforcement composition and the vibration-damping reinforcement material of the present invention are used, is applied for damping vibrations of and reinforcing a thin sheet, in various industries such as automobiles and household electrical appliances.

The invention claimed is:

1. A vibration-damping reinforcement composition comprising:
   160 to 300 parts by weight of butyl rubber,
   30 to 300 parts by weight of acrylonitrile-butadiene rubber,
   100 parts by weight of epoxy resin, and
   0.5 to 30 parts by weight of an epoxy resin curing agent.

2. The vibration-damping reinforcement composition according to claim 1, wherein the butyl rubber has a Mooney viscosity of 25 to 90 ($ML_{1+8}$, 125° C.) and a degree of unsaturation of 0.8 to 2.2.

3. The vibration-damping reinforcement composition according to claim 1, further comprising 10 to 150 parts by weight of polybutene relative to 100 parts by weight of the butyl rubber.

4. A vibration-damping reinforcement sheet comprising:
   a vibration-damping reinforcement layer that is obtained by molding a vibration-damping reinforcement composition into a sheet, and
   a restricting layer that is laminated onto one side of the vibration-damping reinforcement layer,
   wherein the vibration-damping reinforcement composition comprises:
   160 to 300 parts by weight of butyl rubber,
   30 to 300 parts by weight of acrylonitrile-butadiene rubber, 100 parts by weight of epoxy resin, and 0.5 to 30 parts by weight of an epoxy resin curing agent.

5. A method for vibration-damping and reinforcement of thin sheet, wherein a vibration-damping reinforcement sheet is disposed on a thin sheet, and then the vibration-damping reinforcement layer is heated to be cured, wherein the vibration-damping reinforcement sheet comprises:

a vibration-damping reinforcement layer that is obtained by molding a vibration-damping reinforcement composition into a sheet, and a restricting layer that is laminated onto one side of the vibration-damping reinforcement layer, wherein the vibration-damping reinforcement composition comprises:

160 to 300 parts by weight of butyl rubber, 30 to 300 parts by weight of acrylonitrile-butadiene rubber, 100 parts by weight of epoxy resin, and 0.5 to 30 parts by weight of an epoxy resin curing agent.

* * * * *